(12) United States Patent
Cho

(10) Patent No.: US 10,904,401 B2
(45) Date of Patent: Jan. 26, 2021

(54) SELF DRIVING MULTIFUNCTION COPIER, SERVER FOR CONTROLLING SELF DRIVING MULTIFUNCTION COPIER AND METHOD FOR OPERATING SERVER

(71) Applicant: LG Electronics Inc., Seoul (KR)

(72) Inventor: Chang Woo Cho, Gyeonggi-do (KR)

(73) Assignee: LG Electronics Inc., Seoul (KR)

( * ) Notice: Subject to any disclaimer, the term of this patent is extended or adjusted under 35 U.S.C. 154(b) by 0 days.

(21) Appl. No.: 16/564,935

(22) Filed: Sep. 9, 2019

(65) Prior Publication Data

US 2019/0394345 A1 Dec. 26, 2019

(30) Foreign Application Priority Data

Jul. 30, 2019 (KR) .................. 10-2019-0092696

(51) Int. Cl.
*H04N 1/00* (2006.01)
*H04N 1/23* (2006.01)
*G06F 3/12* (2006.01)

(52) U.S. Cl.
CPC ....... *H04N 1/00395* (2013.01); *G06F 3/1204* (2013.01); *G06F 3/1271* (2013.01); *H04N 1/00477* (2013.01); *H04N 1/00482* (2013.01); *H04N 1/2315* (2013.01); *H04N 1/2346* (2013.01); *H04N 1/2376* (2013.01); *H04N 1/2392* (2013.01); *G06F 3/1288* (2013.01)

(58) Field of Classification Search
CPC ............. H04N 1/00395; H04N 1/2315; H04N 1/2392; H04N 1/2346; H04N 1/2376; H04N 1/00482; H04N 1/00477; G06F 3/1271; G06F 3/1204; G06F 3/1288; G06F 3/126
See application file for complete search history.

(56) References Cited

U.S. PATENT DOCUMENTS

| | | | | |
|---|---|---|---|---|
| 7,855,798 | B2* | 12/2010 | Toyoda | B41J 29/393 358/1.13 |
| 2012/0236342 | A1* | 9/2012 | Price | G06F 3/126 358/1.13 |
| 2013/0194626 | A1* | 8/2013 | Sakurai | G06F 3/1204 358/1.15 |

(Continued)

FOREIGN PATENT DOCUMENTS

KR 1020090064953 6/2009

*Primary Examiner* — Helen Zong
(74) *Attorney, Agent, or Firm* — Fish & Richardson P.C.

(57) ABSTRACT

Disclosed are a self-driving multifunction copier capable of performing artificial intelligence learning through machine learning, a server controlling the self-driving multifunction copier, and a method for operating the server. A method for operating a server controlling a self-driving multifunction copier in an Internet of things (IoT) environment constructed through a 5G communication network, which is a method for operating a server controlling a self-driving multifunction copier, includes: in response to receiving an execution request for a job from a user terminal in a building, calculating a processing time of the job; selecting one self-driving multifunction copier among a plurality of self-driving multifunction copiers in the building based on the processing time of the job; and assigning the job to the selected self-driving multifunction copier to allow the selected self-driving multifunction copier to perform the assigned job.

18 Claims, 5 Drawing Sheets

(56) References Cited

U.S. PATENT DOCUMENTS

| | | | |
|---|---|---|---|
| 2015/0062629 A1* | 3/2015 | Tamura | H04N 1/00307 358/1.15 |
| 2015/0193674 A1* | 7/2015 | Ishiguro | G06F 3/1253 358/1.15 |
| 2016/0127592 A1* | 5/2016 | Nakamura | H04N 1/0092 358/1.13 |
| 2017/0357469 A1* | 12/2017 | Ishimaru | H04N 1/00127 |
| 2019/0155558 A1* | 5/2019 | Yamazaki | G06F 3/1286 |
| 2019/0377521 A1* | 12/2019 | Tokuchi | G06F 3/167 |
| 2019/0384549 A1* | 12/2019 | Miyasaka | G06F 3/121 |

* cited by examiner

SELF DRIVING MULTIFUNCTION COPIER, SERVER FOR CONTROLLING SELF DRIVING MULTIFUNCTION COPIER AND METHOD FOR OPERATING SERVER

CROSS-REFERENCE TO RELATED APPLICATION

This present application claims benefit of priority to Korean Patent Application No. 10-2019-0092696, entitled "SELF DRIVING MULTIFUNCTION COPIER, SERVER FOR CONTROLLING SELF DRIVING MULTIFUNCTION COPIER AND METHOD FOR OPERATING SERVER," filed on Jul. 30, 2019, in the Korean Intellectual Property Office, the entire disclosure of which is incorporated herein by reference.

BACKGROUND

1. Technical Field

The present disclosure relates to a technique for performing various jobs (e.g., printing, copying, and faxing) requested by a user terminal in a building to be performed in a self-driving multifunction copier that moves based on map information in the building.

2. Description of Related Art

Office equipment such as printers, copiers, and fax machines are indispensable in companies that handle paperwork and may exist in the form of one multifunction copier.

As the multifunction copier in the company is connected to various terminals through a network and used as a common resource, the multifunction copier is generally installed and used in a common space.

However, as a user of each terminal needs to move to the common space every time in order to use the multifunction device, the user feels inconvenience.

As one of methods in the related art in order to resolve the inconvenience that the user needs to move, there is a method for controlling a robot that delivers a printer output as disclosed in Korean Patent Unexamined Publication No. 2009-0064593.

However, in the method for delivering the output of the printer disclosed in Korean Patent Unexamined Publication 2009-0064953 described above, a document output and an output delivery in the printer may not be simultaneously performed. As a result, in order to perform a document output job in the printer, a printing time of outputting a document and a movement time of delivering the output are taken, and as a result, it is difficult to rapidly process a printing job.

Further, the method for delivering the output of the printer disclosed in Korean Patent Unexamined Publication 2009-0064953 described above is limited only to the printer and may not perform a copying function and even though a robot delivery technique is applied to a general copier, a reciprocation time for which a robot brings the document to the copier from the user and brings a copied copy to the user and a copy time of copying the document are all required, and as a result, it is also difficult to rapidly process the copying job.

Further, even though there is not a lot of actual use time for the multifunction copier, several multifunction copiers are installed in respective floors or departments in the company, and as a result, there is a large cost burden as compared with a usage rate.

Therefore, a multifunction copier control technique is required, which can rapidly perform various jobs while providing convenience of the user and reduce the cost burden.

RELATED ART DOCUMENT

[Patent Document]
Related Art: Korean Patent Application Publication No. 10-2009-0064953

SUMMARY OF THE INVENTION

An aspect of the present disclosure is to resolve inconvenience of a user who needs to directly move to a place at which a multifunction copier is installed in that, in response to execution of a job being requested from a user terminal, the job is assigned to a self-driving multifunction copier so that the assigned job is performed in the self-driving multifunction copier and in that the self-driving multifunction copier moves to a position of the user terminal as necessary.

Another aspect of the present disclosure is to allow a self-driving multifunction copier to rapidly perform a printing job as the self-driving multifunction copier moves while performing printing in that the self-driving multifunction copier moves to the position of the user terminal to provide a printed document while processing the printing job in response to a type of job requested to be performed from the user terminal being 'printing'.

Yet another aspect of the present disclosure is to allow a self-driving multifunction copier to rapidly perform a copying job in that, in response to a type of job requested to be performed from the user terminal being 'copying,' the self-driving multifunction copier moves to the position of the user terminal to perform copying so that copying is performed by the self-driving multifunction copier immediately at a point where a user is located.

Further, still yet another aspect of the present disclosure is to allow more user terminals to use one self-driving multifunction copier as compared with the existing multifunction copier in that a job requested to be performed from the user terminal is performed by using a moving self-driving multifunction copier other than an existing multifunction copier installed at a fixed point, thereby increasing a use rate of the multifunction copier, reducing the number of required multifunction copiers, and reducing cost.

Further, still yet another aspect of the present disclosure is to increase efficiency of job execution by selecting a self-driving multifunction copier to which a job is to be assigned among a plurality of self-driving multifunction copiers based on a distance from the user terminal for the plurality of self-driving multifunction copiers or a job amount in the self-driving multifunction copier.

The technical objects of the present invention are not limited to the aforementioned technical objects, and other technical objects, which are not mentioned above, will be apparently appreciated by a person having ordinary skill in the art from the following description In order to achieve such aspects, according to an exemplary embodiment of the present disclosure, a method for operating a server controlling a self-driving multifunction copier is provided which may include: in response to receiving an execution request for a job from a user terminal in a building, calculating a processing time of the job; selecting one self-driving multifunction copier among a plurality of self-driving multifunction copiers in the building based on the processing time of the job; and assigning the job to the selected self-driving multifunction copier to allow the selected self-driving multifunction copier to perform the assigned job.

In an exemplary embodiment of the present disclosure, the allowing to perform the assigned job may include: providing a position of the user terminal to the selected self-driving multifunction copier at the time of assigning the job; and tracking, by the selected self-driving multifunction copier, a movement route up to the position of the user terminal based on map information in the building and then moving along the tracked movement route.

In an exemplary embodiment of the present disclosure, the calculating may include calculating a movement time required for moving to the position of the user terminal for each of the plurality of self-driving multifunction copiers and the processing time of the job by considering the calculated movement time and a job time required for substantially processing the job, and the selecting of the one self-driving multifunction copier may include selecting a self-driving multifunction copier having a smallest processing time of the job among the plurality of self-driving multifunction copiers, or selecting a self-driving multifunction copier which can most rapidly perform the job by considering a remaining time of a job being currently performed and a total processing time of jobs waiting to be performed among the plurality of self-driving multifunction copiers.

In an exemplary embodiment of the present disclosure, the allowing to perform the assigned job may include: in response to the type of job being 'printing,' allowing the self-driving multifunction copier to move to the position of the user terminal while processing the job to provide a printed document as a result of performing the job; in response to the type of job being 'copying,' allowing the self-driving multifunction copier to move to the position of the user terminal in order to copy an input document and provide a copied copy; and in response to the type of job being 'electronic fax transmission,' allowing the self-driving multifunction copier to transmit the contents associated with the job without moving to the position of the user terminal.

In an exemplary embodiment of the present disclosure, the selecting of the one self-driving multifunction copier may include, in response to the type of task being 'electronic fax transmission', if all of the plurality of self-driving multifunction copiers performs different jobs, selecting a self-driving multifunction copier which is moving for performing the different task, but is not performing printing or copying.

In an exemplary embodiment of the present disclosure, the allowing to perform the assigned job may include in response to both the type of current job being currently performed by one of the plurality of self-driving multifunction copiers and the type of subsequent job waiting to be performed being 'printing' and the movement time to move to the position of the user terminal which requests performing the current job being longer than the printing time of the current job, starting printing of the subsequent job from a time point at which the printing of the current job is terminated.

In an exemplary embodiment of the present disclosure, the selecting of the one self-driving multifunction copier in response to the type of job being 'emergency printing' may include: determining a self-driving multifunction copier having a total additional processible time longer than the processing time of the 'emergency printing' job; and providing information on the determined self-driving multifunction copier to the user terminal requesting to perform the 'emergency printing' job so that a self-driving multifunction copier to perform the 'emergency printing' job can be selected, and the determining of the self-driving multifunction copier may include: calculating the total additional processible time by adding a first additional processible time and a second additional processible time for a self-driving multifunction copier in which both the type of current job being currently performed and the type of subsequent job waiting to be performed are 'printing.' The first additional processible time is acquired by subtracting the printing time of the current job from the first movement time of moving to the position of the user terminal requesting to perform the current job and the second additional processible time is acquired by subtracting the printing time of the subsequent job from the second movement time of moving to the position of the user terminal requesting to perform the subsequent job.

In an exemplary embodiment of the present disclosure, the allowing to perform the assigned job may include: checking at least one item of the number of papers, an ink amount, and a battery amount as a maintenance item of the selected self-driving multifunction copier; and generating a repairing job for an item which does not meet a criterion to perform a task assigned to the selected self-driving multifunction copier according to the checking result and assigning the generated repairing job to the selected self-driving multifunction copier.

In an exemplary embodiment of the present disclosure, the method for operating a server controlling a self-driving multifunction copier may further include: selecting a place located at a shortest distance from the position of the user terminal requesting to perform the job being currently performed in each of the plurality of self-driving multifunction copiers among designated places in the building in the case of a specific situation; and moving each of the plurality of self-driving multifunction copiers to the selected place.

In an exemplary embodiment of the present disclosure, the method for operating a sever controlling a self-driving multifunction copier may further include in response to a message for 'whether to directly receive' at the selected place being provided to the user terminal requesting to perform the job being currently performed and then a message for 'it is impossible to directly receive' being received in response to the message, temporarily stopping the job being currently performed and preferentially performing the subsequent job waiting to be performed.

According to an exemplary embodiment of the present disclosure, a server controlling a self-driving multifunction copier is provided which may include: in response to receiving an execution request for a job from a user terminal in a building, a calculator for calculating a processing time of the job; a selector for selecting one self-driving multifunction copier among a plurality of self-driving multifunction copiers in the building based on the processing time of the job; and a processor for assigning the job to the selected self-driving multifunction copier to allow the selected self-driving multifunction copier to perform the assigned job.

In an exemplary embodiment of the present disclosure, in response to the type of job being 'printing,' the processor may allow the self-driving multifunction copier to move to the position of the user terminal while processing the job and move a printed document as a result of performing the job to a shelf corresponding to the user terminal by using a robot arm of the self-driving multifunction copier.

In an exemplary embodiment of the present disclosure, in response to the type of job being 'copying,' the processor may allow the self-driving multifunction copier to move to the position of the user terminal and put a document located on the shelf corresponding to the user terminal into an entrance by using a robot arm of the self-driving multifunction copier and in response to a copy in which the document is copied being output to an exit, the processor allows the self-driving multifunction copier to move the document and the copy to the shelf corresponding to the user terminal by using the robot arm.

In an exemplary embodiment of the present disclosure, in response to the type of task being 'electronic fax transmission', if all of the plurality of self-driving multifunction copiers performs different jobs, the selector may select a self-driving multifunction copier which is moving for performing the different task, but is not performing printing or copying.

In an exemplary embodiment of the present disclosure, in response to both the type of current job being currently performed by one of the plurality of self-driving multifunction copiers and the type of subsequent job waiting to be performed being 'printing' and the movement time of moving to the position of the user terminal which requests performing the current job being longer than the printing time of the current job, the processor may start printing of the subsequent job from a time point at which the printing of the current job is terminated.

In an exemplary embodiment of the present disclosure, the processor may check at least one item of the number of papers, an ink amount, and a battery amount as a maintenance item of the selected self-driving multifunction copier and generate a repairing job for an item which does not meet a criterion to perform the job assigned to the selected self-driving multifunction copier according to the checking result and then assign the generated repairing job to the selected self-driving multifunction copier.

In an exemplary embodiment of the present disclosure, in the case of the specific situation, the processor may select a place located at the shortest distance from the position of the user terminal requesting to perform the job currently being performed in each of the plurality of self-driving multifunction copiers among designated places in the building and allow each of the plurality of self-driving multifunction copiers to move to the selected place.

In an exemplary embodiment of the present disclosure, in response to a message for 'whether to directly receive' at the selected place being provided to the user terminal requesting to perform the job currently being performed and then a message for 'it is impossible to directly receive' being received in response to the message, the processor may allow the self-driving multifunction copier to temporarily stop the job being currently performed and preferentially perform the subsequent job waiting to be performed.

In an exemplary embodiment of the present disclosure, a self-driving multifunction copier is provided which may include: a detector for detecting a position of a user terminal requesting to perform the job from a job execution command in link with a job execution command from a server controlling the self-driving multifunction copier; and a controller for tracking a movement route up to the position of the user terminal based on map information in a building and, depending on a type of job, moving the self-driving multifunction copier along the tracked movement route.

In an exemplary embodiment of the present disclosure, the detector may further detect the type of job from the job execution command, and the controller may allow the self-driving multifunction copier to perform at least one of: in response to 'printing' being detected as the type of job, moving to the position of the user terminal while processing the job to provide a printed document as a result of performing the job; in response to 'copying' being detected as the type of job, moving to the position of the user terminal to copy an input document and provide a copy in which the document is copied; and in response to 'electronic fax transmission' being detected as the type of job, transmitting the contents associated with the job without moving to the position of the user terminal.

According to an exemplary embodiment of the present disclosure, it is possible to resolve inconvenience of a user who needs to directly move to a place at which a multifunction copier is installed in that when execution of a job is requested from a user terminal, the job is assigned to a self-driving multifunction copier so that the assigned job is performed in the self-driving multifunction copier and in that the self-driving multifunction copier moves to a position of the user terminal as necessary.

According to an exemplary embodiment of the present disclosure, it is possible to allow a self-driving multifunction copier to rapidly perform a printing job as the self-driving multifunction copier moves while performing printing in that the self-driving multifunction copier moves to the position of the user terminal to provide a printed document while processing the printing job in response to a type of job requested to be performed from the user terminal being 'printing'.

According to an exemplary embodiment of the present disclosure, it is possible to allow a self-driving multifunction copier to rapidly perform a copying job in that, when a type of job requested to be performed from the user terminal is 'copying,' the self-driving multifunction copier moves to the position of the user terminal to perform copying so that copying is performed by the self-driving multifunction copier immediately at a point where a user is located.

According to an exemplary embodiment of the present disclosure, it is possible to allow more user terminals to use one self-driving multifunction copier as compared with the existing multifunction copier in that a job requested to be performed from the user terminal is performed by using a moving self-driving multifunction copier other than an existing multifunction copier installed at a fixed point, thereby increasing a use rate of the multifunction copier, reducing the number of required multifunction copiers, and reducing cost. Further, since the self-driving multifunction copier is not installed to a fixed point and moves, a separate installation space is not required, thereby reducing a space.

According to the present disclosure, it is possible to increase efficiency of job execution by selecting a self-driving multifunction copier to which a job is to be assigned among a plurality of self-driving multifunction copiers based on a distance from the user terminal for the plurality of self-driving multifunction copiers or a job amount in the self-driving multifunction copier.

According to the present disclosure, a self-driving multifunction copier can be easily managed by checking a state (e.g., the number of papers, the ink amount, and the battery amount) of the self-driving multifunction copier and controlling to repair items that do not meet criteria according to the checking result.

BRIEF DESCRIPTION OF THE DRAWINGS

The above and other aspects, features, and advantages of the present disclosure will become apparent from the detailed description of the following aspects in conjunction with the accompanying drawings, in which.

DETAILED DESCRIPTION

Figure 1:
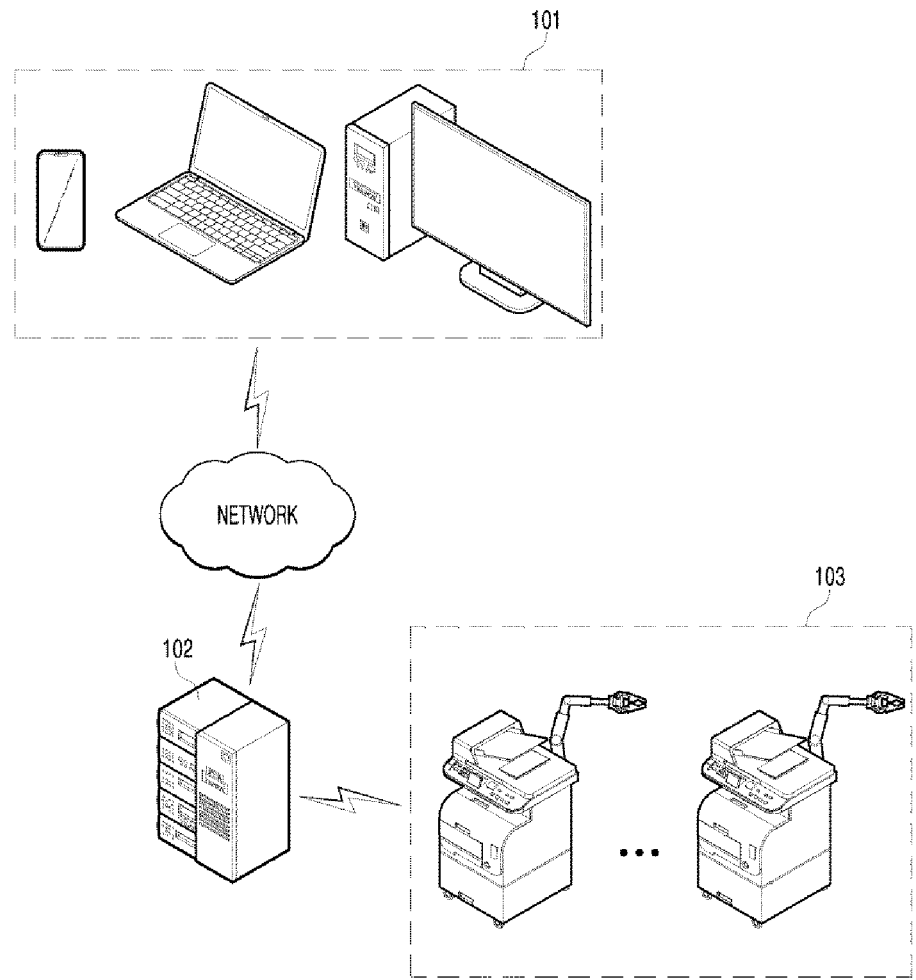
FIG. 1 is a diagram illustrating a configuration of a network including a server for controlling a self-driving multifunction copier according to an exemplary embodiment of the present disclosure.

Hereinafter, the embodiments disclosed in the present specification will be described in detail with reference to the accompanying drawings, the same or similar elements regardless of a reference numeral is denoted by the same reference numeral and a duplicate description thereof will be omitted. The suffixes "module" and "unit" for the element used in the following description are given or mixed considering only ease of writing specification, and do not have their own meaning or role. In the following description of the embodiments disclosed herein, the detailed description of related known technology will be omitted when it may obscure the subject matter of the embodiments according to the present disclosure. The accompanying drawings are merely used to help easily understand embodiments of the present disclosure, and it should be understood that the technical idea of the present disclosure is not limited by the accompanying drawings, and these embodiments include all changes, equivalents or alternatives within the idea and the technical scope of the present disclosure.

Although the terms first, second, third, and the like, may be used herein to describe various elements, components, regions, layers, and/or sections, these elements, components, regions, layers, and/or sections should not be limited by these terms. These terms are generally only used to distinguish one element from another.

It should be understood that when an element is referred to as being "connected to," or "coupled to" another element, it can be directly connected or coupled to the other element, but intervening elements can also be present. The terms "connected" and "coupled" are not restricted to physical or mechanical connections or couplings, and can include electrical connections or couplings, whether direct or indirect.

The connection can be such that the objects are permanently connected or releasably connected.

It must be noted that as used herein and in the appended claims, the singular forms "a," "an," and "the" include the plural references unless the context clearly dictates otherwise.

It should be understood that the terms "comprises," "comprising," "includes," "including," "containing," "has," "having" or any other variation thereof specify the presence of stated features, integers, steps, operations, elements, and/or components, but do not preclude the presence or addition of one or more other features, integers, steps, operations, elements, and/or components.

FIG. 1 is a diagram illustrating a configuration of a network including a server for controlling a self-driving multifunction copier according to an exemplary embodiment of the present disclosure.

Referring to FIG. 1, a network 100 may include a plurality of user terminals 101, a server 102 controlling a self-driving multifunction copier, and a plurality of self-driving multifunction copiers 103.

The plurality of user terminals 101 may be, for example, a personal computer, a tablet PC, a notebook, a smartphone, or the like located in a building. Each user terminal may transmit a registration request to the server 102 that controls the self-driving multifunction copier.

In response to receiving the registration request from the user terminal, the server 102 that controls the self-driving multifunction copier extracts identification information and a position of the user terminal from the registration request and manages the position of the user terminal corresponding to the identification information of the user terminal so that the user terminal can be registered.

The server 102 controlling the self-driving multifunction copier may receive map information in a building from the plurality of self-driving multifunction copiers 103 and match the position of the user terminal corresponding to the identification information of the user terminal based on the received map information.

The plurality of self-driving multifunction copiers 103 may generate the map information in the building through a learning process for route driving in the building and provide the generated map information to the server 102 controlling the self-driving multifunction copier.

The plurality of registered user terminals 101 may use the self-driving multifunction copier 103 through the server 102 controlling the self-driving multifunction copier.

In response to an execution request for a job (e.g., printing, copying, faxing, etc.) being input from the user, the plurality of user terminals 101 transfers the execution request to the server 102 controlling the self-driving multifunction copier and the server 102 controlling the self-driving multifunction copier controls the self-driving multifunction copier 103 to perform the job.

The server 102 controlling the self-driving multifunction copier is connected to the plurality of user terminals 101 and the plurality of self-driving multifunction copiers 103 through a network.

In response to receiving the execution request for the job from the plurality of user terminals 101, the server 102 controlling the self-driving multifunction copier may select one self-driving multifunction copier among the plurality of self-driving multifunction copiers 103 in the building based on a processing time of the job. The server 102 controlling the self-driving multifunction copier transmits a job execution command to the selected self-driving multifunction copier and assigns the job to allow the selected self-driving multifunction copier to perform the assigned job.

In response to assigning the job, the server 102 controlling the self-driving multifunction copier may sequentially assign the job based on a time of receiving the execution request for the job from each user terminal.

In response to the plurality of self-driving multifunction copiers 103 being assigned with the job by receiving the job execution command from the server 102 controlling the self-driving multifunction copier, the plurality of self-driving multifunction copiers 103 may process the assigned job. Specifically, the self-driving multifunction copier may detect the type of job and the position of the user terminal requesting to perform the job from the job execution command in link with the job execution command from the server 102 controlling the self-driving multifunction copier. The self-driving multifunction copier tracks a movement route up to the position of the user terminal requesting to perform the job from a current position based on the map information in the building and moves along the tracked movement route to perform the job.

For example, in response to 'printing' being detected as the type of job, the self-driving multifunction copier moves to the position of the user terminal while processing a printing job and provides a printed document as a result of performing the job, thereby resolving inconvenience of a user who needs to move to the multifunction copier in order to receive the printed document. In response to 'copying' being detected as the type of job, the self-driving multifunction copier moves to the position of the user terminal and copies a document input into an entrance of the self-driving multifunction copier, and provides a copied document in which the document is copied to an exit of the self-driving multifunction copier, thereby resolving even inconvenience of a user who needs to move to the multifunction copier for copying.

Further, in response to 'electronic fax transmission' being detected as the type of job, the self-driving multifunction copier may transmit contents associated with the job to a partner terminal (e.g., a user terminal in another building) of the job without moving to the position of the user terminal.

Figure 2:
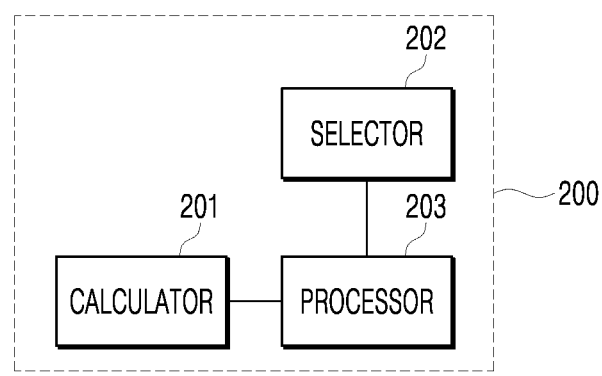
FIG. 2 is a diagram illustrating a configuration of a server for controlling a self-driving multifunction copier according to an exemplary embodiment of the present disclosure.

FIG. 2 is a diagram illustrating a configuration of a server for controlling a self-driving multifunction copier according to an exemplary embodiment of the present disclosure.

Referring to FIG. 2, a server 200 controlling the self-driving multifunction copier according to an exemplary embodiment of the present disclosure may include a calculator 201, a selector 202, and a processor 203.

The calculator 201 may receive execution requests for the job from the plurality of user terminals in the building. In this case, the calculator 201 may process the execution request for the job in the order in which the execution request for the job is received.

In response to receiving the execution request for the job from the user terminal, the calculator 201 may calculate the processing time of the job. Here, the processing time of the job may be calculated by considering a job time (e.g., a printing time or a copying time) required for substantially processing the job and a movement time required for each of the plurality of self-driving multifunction copiers to move to the position (destination) of the user terminal.

First, the calculator 201 may extract at least one information of the type of job (e.g., printing, copying, or faxing), the number of jobs (e.g., the number of printed papers or the number of copies), or the identification information of the user terminal from the execution request.

At the time of calculating the job time, the calculator 201 may calculate the job time based on the type of job and the number of jobs which are extracted.

At the time of calculating the movement time, the calculator 201 may check the position of the user terminal corresponding to the extracted identification information of the user terminal in the map information in the building shared with the plurality of self-driving multifunction copiers and calculate a time required for moving to the checked position of the user terminal at the position (e.g., a current position or a position where a last job is performed) of each self-driving multifunction copier as the movement time. That is, the calculator 201 may calculate the movement time of moving to the position of the user terminal with respect to each of the plurality of self-driving multifunction copiers.

The calculator 201 may calculate the processing time of the job by considering the movement time of moving to the position of the user terminal and the job time for each self-driving multifunction copier. In this case, the calculator 201 may calculate a larger time of the movement time and the job time as the processing time of the job in response to the type of job requested to be performed from the user terminal being 'printing'. The calculator 201 may calculate the processing time of the job by adding the movement time and the job time in response to the type of job requested to be performed from the user terminal being 'copying'. Further, the calculator 201 may calculate the job time as the processing time of the job since there is no movement time in response to the type of job requested to be performed from the user terminal being 'electronic fax transmission'.

The selector 202 may select a self-driving multifunction copier having the smallest processing time among the plurality of self-driving multifunction copiers. That is, the selector 202 may select a self-driving multifunction copier positioned at a shortest distance from the user terminal which requests performing the job among the plurality of self-driving multifunction copiers.

As another example, the selector 202 may confirm existing job amounts (or a processing time of the existing job) in the plurality of self-driving multifunction copiers and select a self-driving multifunction copier having the smallest existing job amount. Specifically, the selector 202 may select a self-driving multifunction copier which may most rapidly perform the job among the plurality of self-driving multifunction copiers by considering a remaining time of a job being currently performed and a total processing time of jobs waiting to be performed.

On the other hand, in response to the type of job being 'electronic fax transmission', if all of the plurality of self-driving multifunction copiers performs different jobs, the selector 202 may select a self-driving multifunction copier which is moving for performing the different job but is not performing printing or copying.

Further, in response to the type of job being 'emergency printing,' the selector 202 determines a self-driving multifunction copier having a total additional processible time larger than the processing time of the 'emergency printing' job and provides information (e.g., the position of the self-driving multifunction copier and a receivable time of the printed document) on the determined self-driving multifunction copier to the user terminal which requests performing the 'emergency printing' job so that a self-driving multifunction copier that is to perform the 'emergency printing' job can be selected. At the time of calculating the total additional processible time, the selector 202 may calculate the total additional processible time for a self-driving multifunction copier in which both the type of current job being currently performed and the type of subsequent job waiting to be performed are 'printing.' In this case, the selector 202 may calculate the total additional processible time by adding a first additional processible time and a second additional processible time in which the first additional processible is acquired by subtracting the printing time of the current job from a first movement time of moving to the position of the user terminal requesting performing the current job and the second additional processible time is acquired by subtracting the printing time of the subsequent job from a second movement time of moving to the position of the user terminal requesting performing the subsequent job.

The processor 203 assigns the job to the selected self-driving multifunction copier to allow the selected self-driving multifunction copier to perform the assigned job. The processor 203 may manage the jobs (jobs currently being performed and jobs waiting to be performed) assigned to each self-driving multifunction copier as a list.

At the time of assigning the job, the processor 203 provides the position of the user terminal to the selected self-driving multifunction copier in order to track a movement route up to the position of the user terminal based on the map information in the building in the selected self-driving multifunction copier and then allow the self-driving multifunction copier to move along the tracked movement route.

Specifically, in response to the type of job requested to be performed from the user terminal being 'printing', the processor 203 allows the selected self-driving multifunction copier to move to the position of the user terminal while processing the printing job so it can rapidly process the printing job and resolve inconvenience of the user who needs to move for printing. In this case, the processor 203 moves the printed document as a result of performing the job to a shelf corresponding to the user terminal by using a robot arm of the self-driving multifunction copier in order to easily transfer the printed document even in case that the user is absent.

In response to the type of job requested to be performed from the user terminal being 'copying', the processor 203 allows the selected self-driving multifunction copier to perform copying after moving to the position of the user terminal in order to resolve inconvenience of the user who needs to move for copying. In this case, the processor 203 puts a document located on the shelf corresponding to the user terminal into an entrance of the self-driving multifunction copier by using a robot arm of the self-driving multifunction copier and in response to the copy in which the document is copied being output to the exit of the self-driving multifunction copier, the processor 203 moves the document and the copy to the shelf corresponding to the user terminal by using the robot arm, thereby perform copying without a delay even in case that the user is absent.

Further, in response to the type of job requested to be performed from the user terminal being 'electronic fax transmission,' the processor 203 transmits the contents associated with the job to the partner terminal (e.g., a user terminal in another building) of the job without moving to the position of the user terminal.

In addition, in response to the type of job requested to be performed from the user terminal being 'document fax transmission,' as with the copying job, the processor 203 allows the selected self-driving multifunction copier to move to the position of the user terminal and then read the input document and transmit the read document to the partner terminal (e.g., the user terminal in another building) of the job.

Further, in response to the type of job requested to be performed from the partner terminal being 'electronic fax reception,' the processor 203 transfers the corresponding contents to the user terminal designated by the partner terminal and in response to the type of job being 'document fax reception,' the processor 203 generates a 'fax output' job and assigns the generated 'fax output' job to the self-driving multifunction copier in order to allow the self-driving multifunction copier to print the corresponding contents and transfer the printed contents to the user terminal designated by the partner terminal.

On the other hand, in response to the self-driving multifunction copier performing the 'printing' job in succession, the processor 203 allows the self-driving multifunction copier to optimize and perform the 'printing' job. Specifically, in response to both the type of current job being currently performed by one of the plurality of self-driving multifunction copiers and the type of subsequent job waiting to be performed being 'printing' and the movement time of moving to the position of the user terminal which requests performing the current job being longer than the printing time of the current job, the processor 203 starts printing of the subsequent job from a time point at which the printing of the current job is terminated.

Further, the processor 203 may manage the self-driving multifunction copier by checking the state of the self-driving multifunction copier. The processor 203 checks at least one item of the number of papers, an ink amount, and a battery amount as a maintenance item of the selected self-driving multifunction copier and generates a repairing job for an item which does not meet a criterion to perform the job assigned to the selected self-driving multifunction copier according to the checking result and then assigns the generated repairing job to the selected self-driving multifunction copier, thereby automatically making up for a lack.

Further, in a specific situation (e.g., attendance time, lunch time, or quitting time), the processor 203 moves the self-driving multifunction copier to a designated place in the building, thereby preventing damage caused due to movement and operation noise of the self-driving multifunction copier. That is, in the specific situation (e.g., attendance time, lunch time, or quitting time), the processor 203 selects a place which is at a shortest distance from the position of the user terminal which requests performing the job being currently performed by each of the plurality of self-driving multifunction copiers among designated places in the building and allows each of the plurality of self-driving multifunction copiers to move to the selected place, thereby limiting the movement. In this case, in response to the processor 203 providing to the user terminal requesting to perform the job being currently performed a message for 'whether to directly receive' at the selected place and then receiving a message for 'it is impossible to directly receive' in response to the message, the processor 203 may allow the self-driving multifunction copier to temporarily stop the job being currently performed and preferentially perform the subsequent job waiting to be performed.

In response to the processor 203 determining that a current situation is an emergency situation, the processor 203 may move the self-driving multifunction copier to a designated evacuation site and allows the self-driving multifunction copier to generate an emergency situation notification, thereby rapidly notifying the emergency situation to neighborhood.

Figure 3:
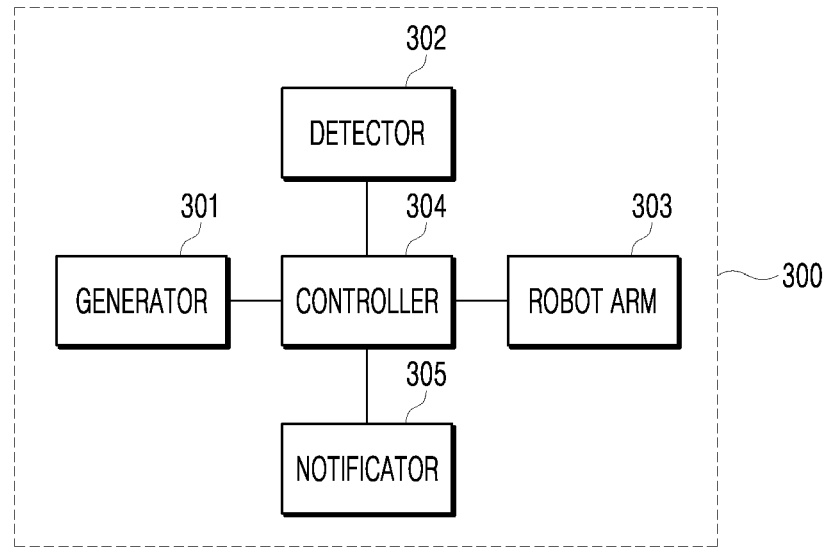
FIG. 3 is a diagram illustrating a configuration of a self-driving multifunction copier according to an exemplary embodiment of the present disclosure.

FIG. 3 is a diagram illustrating a configuration of a self-driving multifunction copier according to an exemplary embodiment of the present disclosure.

Referring to FIG. 3, a self-driving multifunction copier 300 according to an exemplary embodiment of the present disclosure may include a generator 301, a detector 302, a robot arm 303, a controller 304, and a notificator 305.

The generator 301 generates the map information in the building through a learning process for route driving in the building and transmits the generated map information to the server controlling the self-driving multifunction copier in order to share the map information.

The learning process of the route driving in the building may be a process of: accumulating data sets in which a route determined by a pre-established route setting deep neural network model is combined with an actual movement time taken for driving on the corresponding route; and relearning the deep neural network model by using the data sets.

The detector 302 may detect the type of job, the number of jobs, and the position of the user terminal requesting to perform the job from the job execution command in link with the job execution command from the server controlling the self-driving multifunction copier.

The robot arm 303 may operate under the control of the controller 304 so that it moves documents during the job processing or operates an elevator button when moving between floors in the building.

The controller 304 tracks the movement route up to the position of the user terminal from the current position based on the map information in the building and moves along the tracked movement route in order to perform the job. The controller 304 may perform the job according to the type of job and the number of jobs.

Specifically, in response to 'printing' being detected as the type of job, the controller 304 may move to the position of the user terminal while processing the job and provide the printed document as the result of performing the job. In response to 'copying' being detected as the type of job, the controller 304 may copy the input document by moving to the position of the user terminal and provide the copy in which the document is copied. Further, when as the type of job, 'electronic fax transmission' is detected, the controller 304 may transmit the contents associated with the job to the partner terminal (e.g., the user terminal in another building) of the job without moving to the position of the user terminal.

The controller 304 may control the robot arm 303 for moving documents during the job processing or for operating the elevator button in response to moving between the floors in the building.

Further, in response to printing or copying being completed, the controller 304 generates the notification through the notificator 305 in order to provide a job completion time point and a job completion position.

Further, based on determination that the current situation is determined as the specific situation (e.g., lunch time or quitting time) or an emergency situation (e.g., fire occurrence or patient occurrence) by a sensor (not illustrated), the controller 304 may provide a determination result to the server controlling the self-driving multifunction copier. In this case, in the case of the emergency situation, the controller 304 generates the notification for the emergency situation through the notificator 305 to allow neighboring persons to recognize the emergency situation.

For example, based on determination that it is 'lunch time' by controller sensing that a lighting in the building is equal to or less than a set value (for example, off) through the sensor, the controller 304 may provide the 'lunch time' to the server controlling the self-driving multifunction copier and move to a designated place and perform the job according to the control of the server controlling the self-driving multifunction copier.

Further, based on determination that it is a fire situation by sensing smoke or fire through the sensor, the controller 304 may provide the fire situation to the server controlling the self-driving multifunction copier and move to the designated place according to the control of the server controlling the self-driving multifunction copier. In this case, the controller 304 generates the notification for the fire situation through the notificator 305 to allow the neighboring persons to recognize the fire situation.

The notificator 305 may include, for example, at least one of a light emitting diode (LED) lamp, a display, and a speaker and generate the notification in link with job completion.

Further, the notificator 305 may generate the notification for the emergency situation according to the control of the controller 304 in the case of the emergency situation.

Figure 4:
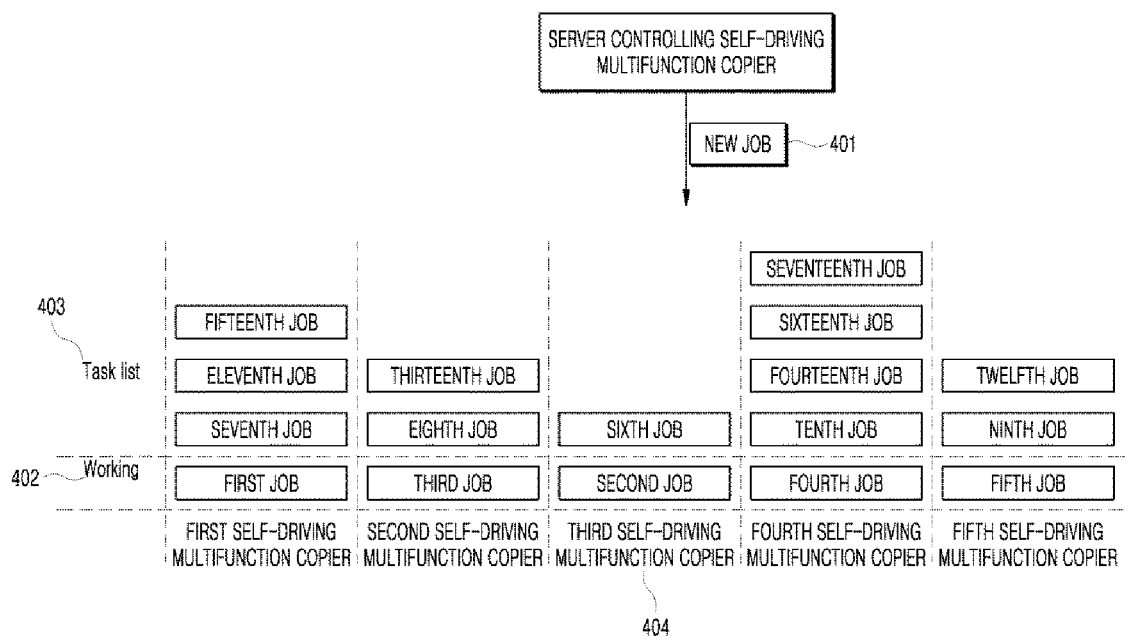
FIG. 4 is a diagram for describing an example of selecting a self-driving multifunction copier to which a job requested to be performed from a user terminal is to be assigned by a server for controlling a self-driving multifunction copier according to an exemplary embodiment of the present disclosure.

FIG. 4 is a diagram for describing an example of selecting a self-driving multifunction copier to which a job requested to be performed from a user terminal is to be assigned by a server for controlling a self-driving multifunction copier according to an exemplary embodiment of the present disclosure.

Referring to FIG. 4, in response to the server controlling the self-driving multifunction copier receiving a request for performing the job from the user terminal, the server may select one self-driving multifunction copier among the plurality of self-driving multifunction copiers and assign the job to the selected self-driving multifunction copier.

In this case, the server controlling the self-driving multifunction copier may confirm the existing job amounts (or the processing time of the existing job) in the plurality of self-driving multifunction copiers and select a self-driving multifunction copier having the smallest existing job amount. The server controlling the self-driving multifunction copier may confirm the existing job amount in each self-driving multifunction copier based on the job being currently performed and the job waiting to be performed, which is managed as the job list for each self-driving multifunction copier.

For example, in response to the server controlling the self-driving multifunction copier receiving an execution request for a new job 401 from the user terminal, the server controlling the self-driving multifunction copier may confirm the existing job amount in each self-driving multifunction copier and select a third self-driving multifunction copier 404 having the smallest job amount among the plurality of self-driving multifunction copiers based on a job 402 being currently performed and a job waiting to be performed, which is managed as a job list 403 for each self-driving multifunction copier. The server controlling the self-driving multifunction copier assigns the new job 401 to the third self-driving multifunction copier 404, thereby distributing the job amounts to be performed by the plurality of self-driving multifunction copiers in a balanced manner and allowing the new job 401 to be rapidly performed.

As another example, at the time of selecting the self-driving multifunction copier, the server controlling the self-driving multifunction copier may select a self-driving multifunction copier having the smallest processing time of the job requested to be performed from the user terminal among the plurality of self-driving multifunction copiers. Here, the processing time of the job may include a job time (e.g., a printing time or a copying time) required for substantially processing the job and a movement time required for the self-driving multifunction copier to move to the position (destination) of the user terminal.

For example, the server controlling the self-driving multifunction copier may calculate the processing time of the new job 401 for each self-driving multifunction copier in response to the request for execution of the new job 401 being received. Here, the processing time of the new job 401 may include a job time for substantially processing the new job 401 and a movement time required for each of the plurality of self-driving multifunction copiers to move to the position of the user terminal.

Specifically, the server controlling the self-driving multifunction copier may extract the type ('printing') of the new job 401 and the number ('10 sheets') of jobs from the execution request and calculate the processing time of '10 seconds' for the new job 401 based on the type of new job 401 and the number of jobs which are extracted.

In addition, the server controlling the self-driving multifunction copier may extract the identification information of the user terminal requesting to perform the new job 401 from the execution request and confirm the position of the user terminal corresponding to the extracted identification information of the user terminal from the map information in the building. The server controlling the self-driving multifunction copier may calculate times taken to move from the positions (positions where a last job is performed) of first to fifth self-driving multifunction copiers to the confirmed position of the user terminal as first to fifth movement times, respectively. That is, the server controlling the self-driving multifunction copier may calculate a time of '20 seconds' taken to move to the position of the user terminal from the position (a position where a fifteenth job is performed) of the first self-driving multifunction copier as the first movement time and calculate a time of '30 seconds' take to move to the position of the user terminal from the position (a position where a twelfth job is performed) of the fifth self-driving multifunction copier as the fifth movement time.

Thereafter, in response to the type of job requested to be performed from the user terminal being 'printing,' the server controlling the self-driving multifunction copier may calculate a larger time of the movement time and the job time as a processing time. Since each of the first movement time of '20 seconds,' the second movement time of '15 seconds,' the third movement time of '50 seconds,' the fourth movement time of '40 seconds,' and the fifth movement time of '30 seconds' is larger than the job time of '10 seconds,' the server controlling the self-driving multifunction copier may calculate the first to fifth movement times as the processing times ('20 seconds,' '15 seconds,' '50 seconds,' '40 seconds,' and '30 seconds') of the new job 401 for the first to fifth self-driving multifunction copiers, respectively.

The server controlling the self-driving multifunction copier selects the second self-driving multifunction copier having the smallest processing time of the new job 401 and assigns the new job 401 to the second self-driving multifunction copier so as to allow the self-driving multifunction copier located at a relatively shorter distance from the user terminal to perform the new job 401, thereby minimizing movement of the self-driving multifunction copier.

In response to the execution request for the new job being received from the user terminal, the server controlling the self-driving multifunction copier may select the self-driving multifunction copier to which the new job is to be assigned by considering the existing job amounts in the plurality of self-driving multifunction copiers and the processing times of the new job in the plurality of self-driving multifunction copiers, but is not limited thereto and may select the self-driving multifunction copier by considering both the existing job amounts and the processing times of the new job. For example, the server controlling the self-driving multifunction copier may preferentially select self-driving multifunction copiers in which the existing job amount is equal to or less than a set value and finally select a self-driving multifunction copier having the smallest processing time of the new job among the selected self-driving multifunction copiers.

Figure 5:
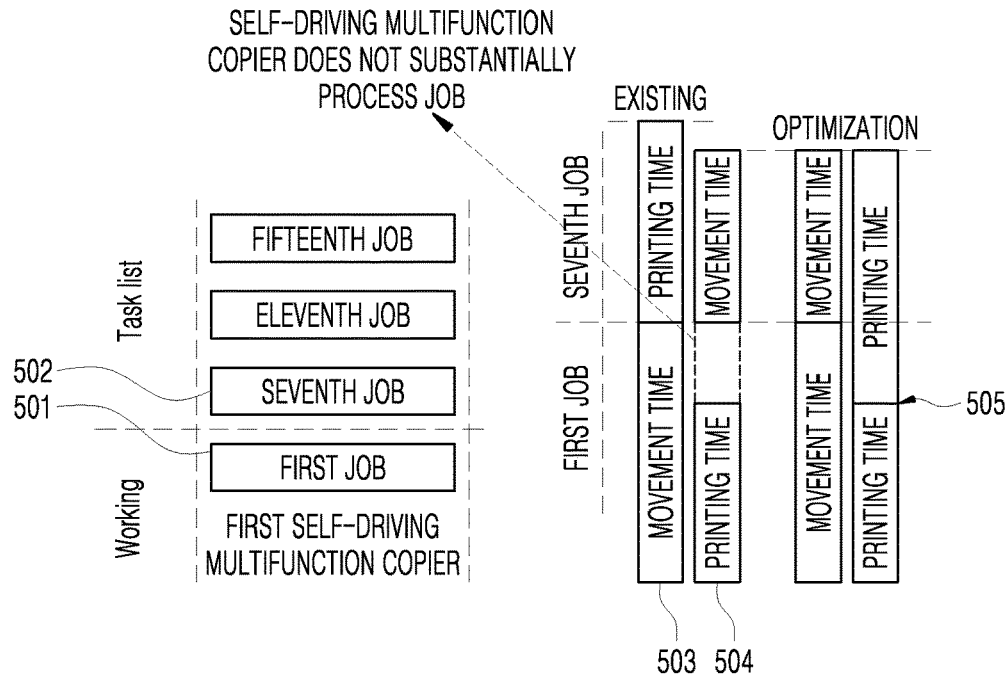
FIG. 5 is a diagram for describing an example of controlling for optimizing and performing a job in a self-driving multifunction copier by a server for controlling a self-driving multifunction copier according to an exemplary embodiment of the present disclosure.

FIG. 5 is a diagram for describing an example of controlling for optimizing and performing a job in a self-driving multifunction copier by a server for controlling a self-driving multifunction copier according to an exemplary embodiment of the present disclosure.

Referring to FIG. 5, the server controlling the self-driving multifunction copier optimizes job processing in the self-driving multifunction copier to allow the self-driving multifunction copier to efficiently perform the job.

Specifically, in response to both the type of current job being currently performed by the self-driving multifunction copier and the type of subsequent job waiting to be performed being 'printing' and the movement time of moving to the position of the user terminal which requests performing the current job being longer than the printing time of the current job, the server controlling the self-driving multifunction copier starts printing of the subsequent job from a time point at which the printing of the current job is terminated.

For example, in response to both types of first job 501 being currently performed by the first self-driving multifunction copier and subsequent seventh job 502 waiting to be performed being 'printing' and a movement time 503 to move to the position of the user terminal requesting to perform the first job 501 being longer than a printing time 504 of the first job 501, the server controlling the self-driving multifunction copier starts printing of the seventh job 502 from a time point 505 in response to the printing of the first job 501 being terminated, thereby reducing a total processing time of the first job 501 and the seventh job 502.

Figure 6:
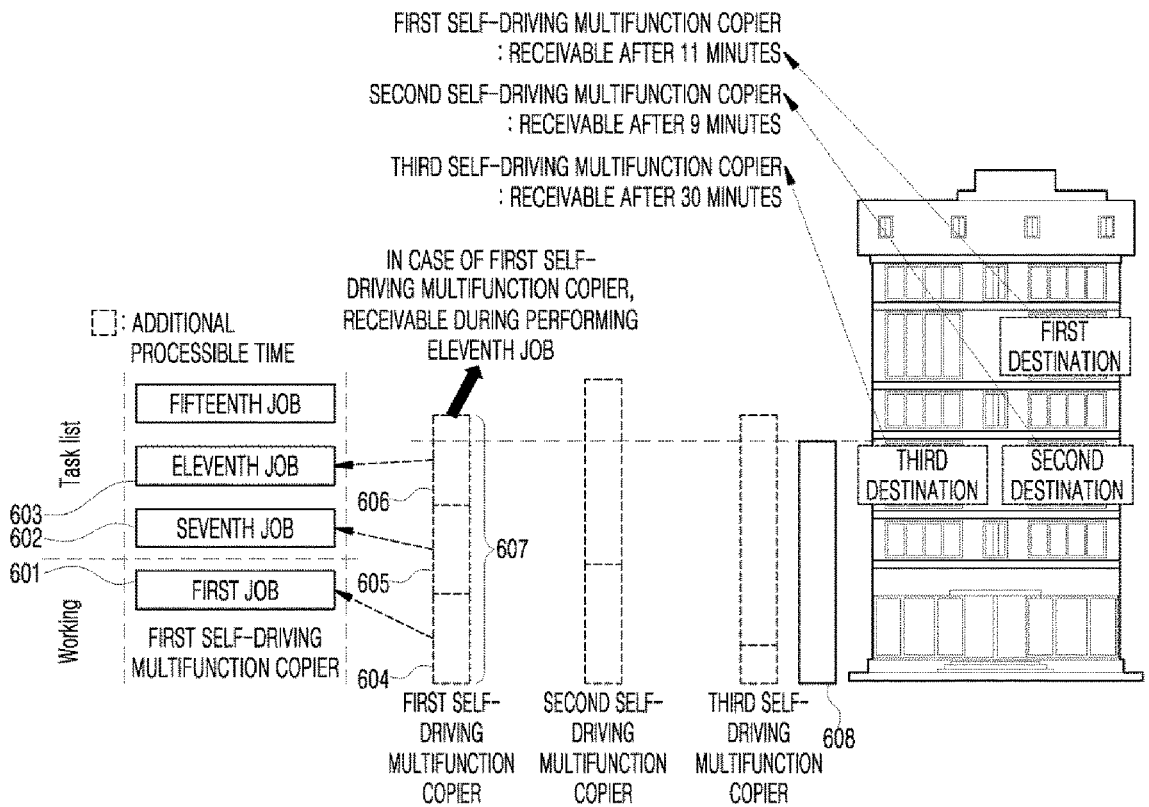
FIG. 6 is a diagram for describing another example of selecting a self-driving multifunction copier to which a job requested to be performed from a user terminal is to be assigned by a server for controlling a self-driving multifunction copier according to an exemplary embodiment of the present disclosure.

FIG. 6 is a diagram for describing another example of selecting a self-driving multifunction copier to which a job requested to be performed from a user terminal is to be assigned by a server for controlling a self-driving multifunction copier according to an exemplary embodiment of the present disclosure.

Referring to FIG. 6, in response to the type of job requested to be performed from the user terminal being 'emergency printing,' the server controlling the self-driving multifunction copier determines a self-driving multifunction copier having a total additional processible time longer than the processing time of the 'emergency printing' job and provides information (e.g., the position of the self-driving multifunction copier and a receivable time of the printed document) on the determined self-driving multifunction copier to the user terminal so that a self-driving multifunction copier that is to perform the 'emergency printing' job can be selected, thereby directly receiving the printed document at a desired position.

At the time of calculating the total additional processible time, the server controlling the self-driving multifunction copier may calculate the total additional processible time by adding a first additional processible time and a second additional processible time for a self-driving multifunction copier in which both the type of current job being currently performed and the type of subsequent job waiting to be performed are 'printing.' Here, the first additional processible time is acquired by subtracting the printing time of the current job from the first movement time of moving to the position of the user terminal requesting to perform the current job and the second additional processible time is acquired by subtracting the printing time of the subsequent job from the second movement time of moving to the position of the user terminal requesting to perform the subsequent job.

For example, in response to both the type of a first job 601 being currently performed by the first self-driving multifunction copier and the types of a seventh job 602 and an eleventh job 603 waiting to be performed next being 'printing,' the server controlling the self-driving multifunction copier may calculate a first additional processible time 604 acquired by subtracting the printing time of the first job from the first movement time in response to the first self-driving multifunction copier moving to the position of the user terminal requesting to perform the first job 601 and calculate a second additional processible time 605 acquired by subtracting the printing time of the seventh job 602 from the second movement time in response to the first self-driving multifunction copier moving to the position of the user terminal requesting to perform the seventh job 602. Further, the server controlling the self-driving multifunction copier may calculate a third additional processible time 606 acquired by subtracting the printing time of the eleventh job 603 from the second movement time in response to the first self-driving multifunction copier moving to the position of the user terminal requesting to perform the eleventh job 603.

Thereafter, the server controlling the self-driving multifunction copier may calculate a total additional processible time 607 in the first self-driving multifunction copier by adding the first additional processible time 604, the second additional processible time 605, and the third additional processible time 606.

The server controlling the self-driving multifunction copier may calculate the total additional processible times in the second and third self-driving multifunction copiers similarly to the first self-driving multifunction copier and since the total additional processible times in the first, second, and third self-driving multifunction copiers are larger than a processing time 608 of the 'emergency printing' job, the server controlling the self-driving multifunction copier provides information on the first to third self-driving multifunction copiers to the user terminal requesting to perform the 'emergency printing' job so that a self-driving multifunction copier which is to perform the 'emergency printing' job can be selected.

In this case, the server controlling the self-driving multifunction copier provides a message 'the printed document is receivable after 11 minutes at a first destination' as information on the first self-driving multifunction copier, a message 'the printed document is receivable after 9 minutes at a second destination' as information on the second self-driving multifunction copier, and a message 'the printed document is receivable after 30 minutes at a third destination' as information on the third self-driving multifunction copier to the user terminal so that it can efficiently select a self-driving multifunction copier which is to perform the 'emergency printing' job by considering the position of the self-driving multifunction copier and a printed document receivable time.

Figure 7:
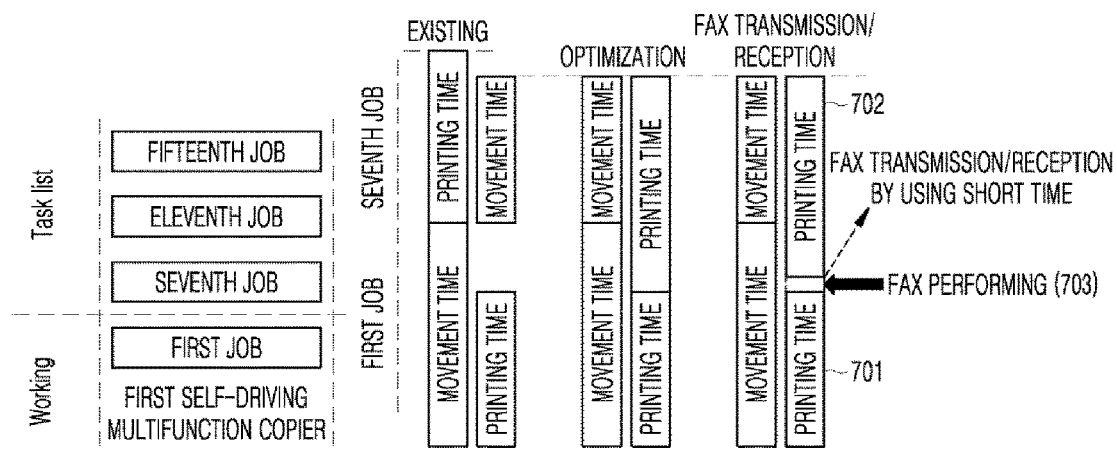
FIG. 7 is a diagram for describing an example of controlling a self-driving multifunction copier to perform a job requested to be performed from a user terminal by a server for controlling a self-driving multifunction copier according to an exemplary embodiment of the present disclosure.

FIG. 7 is a diagram for describing an example of controlling a self-driving multifunction copier to perform a job requested to be performed from a user terminal by a server for controlling a self-driving multifunction copier according to an exemplary embodiment of the present disclosure.

Referring to FIG. 7, in response to the type of job requested to be performed from the user terminal being 'electronic fax transmission,' if all of the plurality of self-driving multifunction copiers performs different jobs, the server controlling the self-driving multifunction copier may select a self-driving multifunction copier which is moving for performing the different job, but is not performing printing or copying and assign the job to the selected self-driving multifunction copier.

Further, in response to the type of job requested to be performed from the user terminal being 'electronic fax transmission', the server controlling the self-driving multifunction copier may allow the 'electronic fax transmission' to be performed while the self-driving multifunction copier which performs the 'printing' job in succession performs the 'printing' job.

For example, in response to the type of the job requested to be performed from the user terminal being 'electronic fax transmission', if the first self-driving multifunction copier performs the first job of 'printing' and the seventh job of 'printing' in succession, the server controlling the self-driving multifunction copier may assign the 'electronic fax transmission' job to the first self-driving multifunction copier so as to perform the 'electronic fax transmission' job 703 between a printing time 701 of the first job and a printing time 702 of the seventh job.

Figure 8:
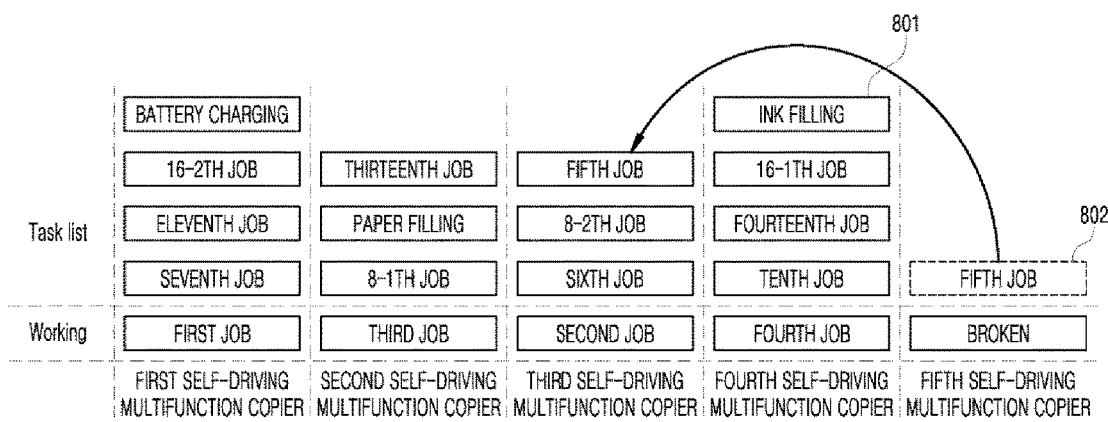
FIG. 8 is a diagram for describing an example of managing a self-driving multifunction copier by a server for controlling a self-driving multifunction copier according to an exemplary embodiment of the present disclosure.

FIG. 8 is a diagram for describing an example of managing a self-driving multifunction copier by a server for controlling a self-driving multifunction copier according to an exemplary embodiment of the present disclosure.

Referring to FIG. 8, the server controlling the self-driving multifunction copier may check and manage each of states of the plurality of self-driving multifunction copiers.

Specifically, the server controlling the self-driving multifunction copier checks the state of the self-driving multifunction copier to which the new job is to be assigned when assigning the new job or checks the states of the plurality of self-driving multifunction copiers at a set cycle in order to manage the self-driving multifunction copier.

When checking the state of the self-driving multifunction copier at the time of assigning the new job, the server controlling the self-driving multifunction copier may check at least one item of the number of papers, the link amount, and a battery amount as a maintenance item of the self-driving multifunction copier for the self-driving multifunction copier selected for assigning the new job, generate the repairing job for an item which does not meet a criterion to perform the new job according to the checking result, and then assign the generated repairing job to the self-driving multifunction copier. In this case, the server controlling the self-driving multifunction copier may assign the new job to another self-driving multifunction copier in case that there is the item which does not meet the criterion.

For example, the server controlling the self-driving multifunction copier may generate an 'ink filling' job 801 and assign the generated 'ink filling' job 801 to the self-driving multifunction copier in response to the ink amount of the self-driving multifunction copier selected for assigning the new job not meeting an ink criterion to perform the new job.

In case of checking the states of the plurality of self-driving multifunction copiers at a set cycle, the server controlling the self-driving multifunction copier may check at least one item of the number of papers, the link amount, and a battery amount as a maintenance item of the self-driving multifunction copier, generate the repairing job for an item which does not meet a set criterion according to the checking result, and then assign the generated repairing job to the selected self-driving multifunction copier in order to establish an environment in which the self-driving multifunction copier may continuously perform the job.

The self-driving multifunction copier that performs the repairing job may move to a designated place in the building and perform the repairing job. In this case, the self-driving multifunction copier may be provided with an article (e.g., paper, ink, or battery) corresponding to the repairing job by a management robot located at the designated place.

On the other hand, as the self-driving multifunction copier performs a 'battery charging' job, in response to the self-driving multifunction copier being charged at a designated place, the server controlling the self-driving multifunction copier may assign the new job to the self-driving multifunction copier or assign the new job to another self-driving multifunction copier according to the type of new job at the time of assigning the new job. For example, the server controlling the self-driving multifunction copier may assign the new job to the self-driving multifunction copier being charged in response to the type of new job being 'electronic fax transmission,' while the server may assign the new job to another self-driving multifunction copier in response to the type of new job being 'copying'. In addition, if the type of new job is 'printing' and the self-driving multifunction copier being charged only supports direct reception, the server controlling the self-driving multifunction copier may assign the new job to the self-driving multifunction copier being charged only in response to a user of the user terminal requesting to perform the new job being able to directly receive the printed document.

In addition, based on confirmation that the self-driving multifunction copier is broken, the server controlling the self-driving multifunction copier may retrieve the job previously assigned to the broken self-driving multifunction copier and reassign the retrieved job to another self-driving multifunction copier. For example, based on determination that the fifth self-driving multifunction copier is broken, the server controlling the self-driving multifunction copier may retrieve a fifth job 802 previously assigned to the fifth self-driving multifunction copier and reassign the retrieved fifth job 802 to the third self-driving multifunction copier having the smallest amount of existing job.

On the other hand, in response to the server controlling the self-driving multifunction copier reassigning the job retrieved from the broken self-driving multifunction copier, the server controlling the self-driving multifunction copier may retrieve the job waiting to be performed in the job list for all self-driving multifunction copiers together and reassign the retrieved jobs again.

As another example, the server controlling the self-driving multifunction copier may reassign the job retrieved from the broken self-driving multifunction copier to the self-driving multifunction copier that performs the job of another user terminal located at the shortest distance from the user terminal requesting to perform the job. For example, in response to a second user terminal being located at the shortest distance from a first user terminal requesting to perform the retrieved fifth job and the job which the second user terminal requests to perform being a thirteenth job assigned to a second self-driving multifunction copier, the server controlling the self-driving multifunction copier may assign the fifth job retrieved from the broken self-driving multifunction copier to the second self-driving multifunction copier so as to perform the fifth job immediately after the thirteenth job.

As yet another example, the server controlling the self-driving multifunction copier may treat the job retrieved from the broken self-driving multifunction copier as the new job and reassign the job to the self-driving multifunction copier selected from the plurality of self-driving multifunction copiers.

Figure 9:
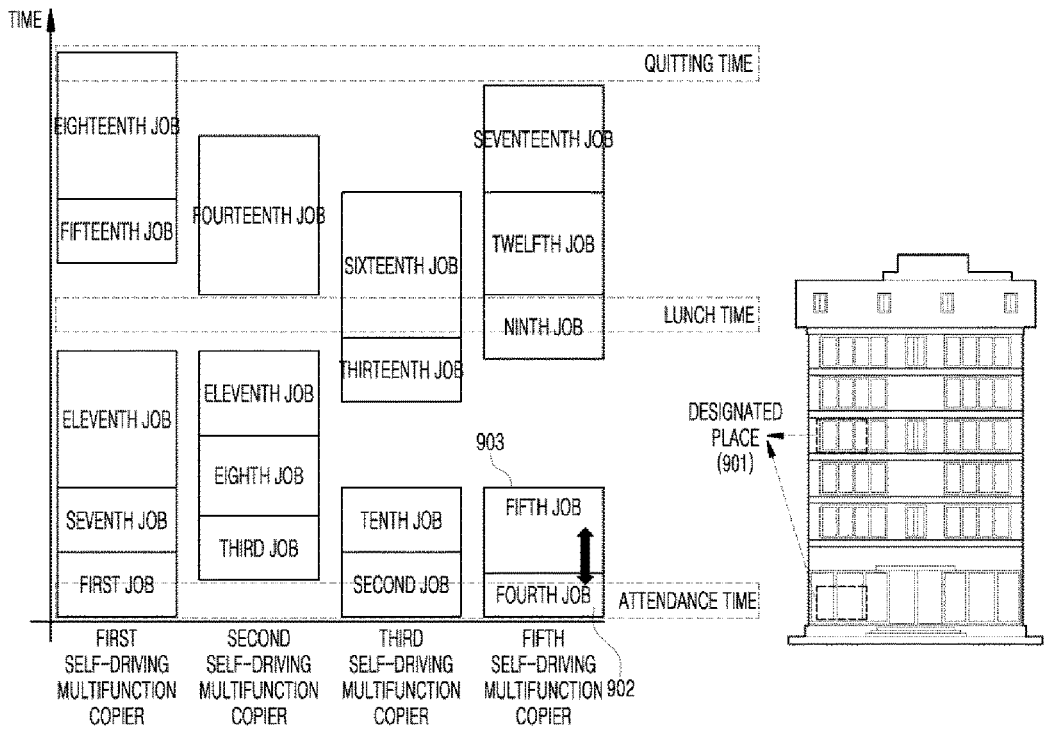
FIG. 9 is a diagram for describing an example of controlling a self-driving multifunction copier in a specific situation by a server for controlling a self-driving multifunction copier according to an exemplary embodiment of the present disclosure.

FIG. 9 is a diagram for describing an example of controlling a self-driving multifunction copier in a specific situation by a server for controlling a self-driving multifunction copier according to an exemplary embodiment of the present disclosure.

Referring to FIG. 9, for example, in response to a current time being included in a designated specific time or the self-driving multifunction copier detecting that the lighting in the building is equal to or less than a set value (e.g., lights-out), the server controlling the self-driving multifunction copier may determine that it is a specific situation (e.g., attendance time, lunch time, or quitting time).

In response to the self-driving multifunction copier determining that it is the specific situation, the plurality of self-driving multifunction copiers processes the job at a designated place to limit the movement of the self-driving multifunction copier, thereby preventing the self-driving multifunction copier from being an obstacle the movement of persons in the building or disturbing rests of the persons.

Specifically, in the case of the specific situation, the server controlling the self-driving multifunction copier selects a place located at the shortest distance from the position of the user terminal requesting to perform the job currently being performed in each of the plurality of self-driving multifunction copiers among designated places in the building and allows each of the plurality of self-driving multifunction copiers to move to the selected place.

In this case, in response to the server controlling the self-driving multifunction copier providing to the user terminal requesting to perform the job being currently performed a message for 'whether to directly receive' at the selected place and then receiving a message for 'it is impossible to directly receive' in response to the message, the server controlling the self-driving multifunction copier may allow the self-driving multifunction copier to temporarily stop the job being currently performed and preferentially perform the job of the user terminal in which 'it is possible to directly receive' among the subsequent job waiting to be performed.

For example, in the case of the attendance time, the server controlling the self-driving multifunction copier may select a position located at the shortest distance from the fourth self-driving multifunction copier among designated places 901 and move the fourth self-driving multifunction copier to the selected place. In this case, the server controlling the self-driving multifunction copier may provide to the user terminal requesting to perform a fourth job 902 the message 'whether to directly receive' at the selected place at attendance time in association with the fourth job 902 being currently performed by the fourth self-driving multifunction copier. In response to receiving the message 'it is impossible to directly receive' in response to the message, the server controlling the self-driving multifunction copier may allow the self-driving multifunction copier to temporarily stop the fourth job 902 being currently performed and preferentially perform a fifth job 903 of the user terminal in which 'it is possible to directly receive' among the jobs waiting to be performed next.

Further, for example, in response to fire occurrence or occurrence of an emergency patient in the building being detected by the self-driving multifunction copier, the server controlling the self-driving multifunction copier may determine that it is an emergency situation.

Based on determination that it is the emergency situation, the server controlling the self-driving multifunction copier may move the self-driving multifunction copier to a designated evacuation site and allow the self-driving multifunction copier to generate an emergency situation notification, thereby rapidly notifying the emergency situation to neighborhood.

Figure 10:
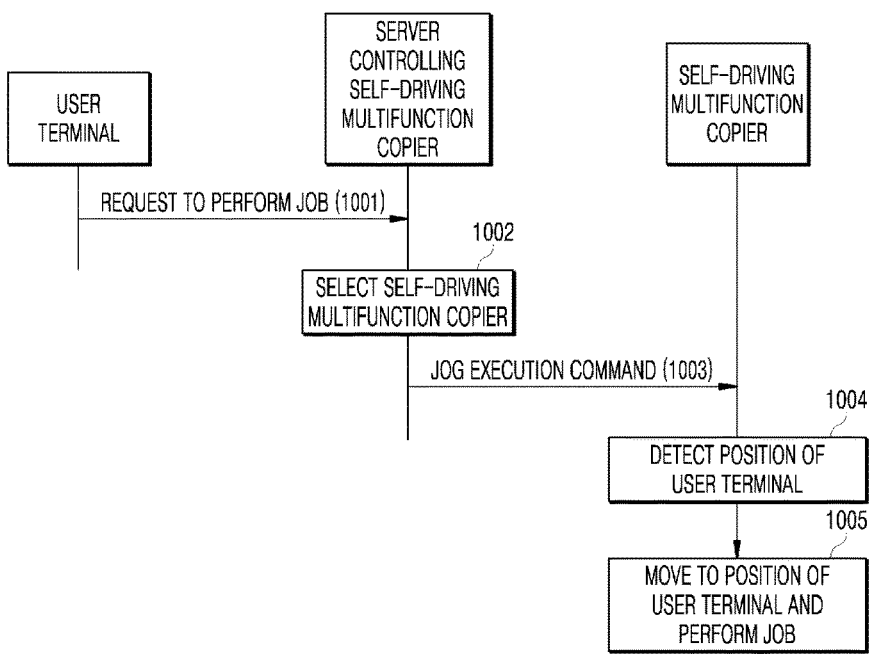
FIG. 10 is a message flowchart showing an operating method of a server for controlling a self-driving multifunction copier according to an exemplary embodiment of the present disclosure.

FIG. 10 is a message flowchart showing an operating method of a server for controlling a self-driving multifunction copier according to an exemplary embodiment of the present disclosure.

Referring to FIG. 10, the user terminal may be located in the building, and in response to an execution request for a job (for example, printing, copying, or faxing) being input from the user, the user terminal may transfer the execution request to the server controlling the self-driving multifunction copier (1001).

in response to receiving the execution request for the job from the user terminal, the server controlling the self-driving multifunction copier may calculate the processing time of the job. In this case, the server controlling the self-driving multifunction copier may calculate the processing time of the job for each of the plurality of self-driving multifunction copiers by considering a job time (e.g., a printing time or a copying time) required for substantially processing the job and a movement time required for each of the plurality of self-driving multifunction copiers to move to the position (destination) of the user terminal.

At the time of calculating the job time, the server controlling the self-driving multifunction copier may calculate the job time based on the type of job and the number of jobs which are extracted from the execution request.

At the time of calculating the movement time, the server controlling the self-driving multifunction copier checks the position of the user terminal corresponding to the identification information of the user terminal extracted from the execution request in the map information in the building shared with the plurality of self-driving multifunction copiers and calculates a time required for moving to the checked position of the user terminal at the position (e.g., a current position or a position where a last job is performed) of each self-driving multifunction copier as the movement time.

At the time of calculating the processing time of the job, the server controlling the self-driving multifunction copier may calculate a larger time of the movement time and the job time in response to the type of job requested to be performed from the user terminal being 'printing,' for example. The server controlling the self-driving multifunction copier may calculate the processing time of the job by adding the movement time and the job time in response to the type of job requested to be performed from the user terminal being 'copying'. Further, in response to the type of job requested to be performed from the user terminal being 'electronic fax transmission,' the server controlling the self-driving multifunction copier may calculate the job time as the processing time of the job since there is no movement time.

The server controlling the self-driving multifunction copier may select the self-driving multifunction copier having the smallest processing time among the plurality of self-driving multifunction copiers (1002).

As another example, the server controlling the self-driving multifunction copier may select a self-driving multifunction copier which can most rapidly perform the job among the plurality of self-driving multifunction copiers by considering a remaining time of a job being currently performed and a total processing time of jobs waiting to be performed.

Further, in response to the type of job being 'electronic fax transmission', if all of the plurality of self-driving multifunction copiers performs different jobs, the server controlling the self-driving multifunction copier may select a self-driving multifunction copier which is moving for performing the different job, but is not performing printing or copying.

Further, in response to the type of job being 'emergency printing,' the server controlling the self-driving multifunction copier determines a self-driving multifunction copier having a total additional processible time larger than the processing time of the 'emergency printing' job and provides information on the determined self-driving multifunction copier to the user terminal which requests performing the 'emergency printing' job so that a self-driving multifunction copier that is to perform the 'emergency printing' job can be selected. At the time of calculating the total additional processible time, the server controlling the self-driving multifunction copier may calculate the total additional processible time by adding a first additional processible time and a second additional processible time for a self-driving multifunction copier in which both the type of current job being currently performed and the type of subsequent job waiting to be performed are 'printing.' Here, the first additional processible time is acquired by subtracting the printing time of the current job from the first movement time of moving to the position of the user terminal requesting to perform the current job and the second additional processible time is acquired by subtracting the printing time of the subsequent job from the second movement time of moving to the position of the user terminal requesting to perform the subsequent job.

The server controlling the self-driving multifunction copier transmits a job execution command to the selected self-driving multifunction copier and assigns the job to allow the selected self-driving multifunction copier to perform the assigned job (1003). At the time of assigning the job, the server controlling the self-driving multifunction copier may provide the position of the user terminal to the selected self-driving multifunction copier.

Specifically, in response to the type of job being 'printing', the server controlling the self-driving multifunction copier allows the self-driving multifunction copier to move to the position of the user terminal while processing the job to provide the printed document as the result of performing the job.

In response to the type of job being 'copying', the server controlling the self-driving multifunction copier allows the self-driving multifunction copier to move to the position of the user terminal to copy the input document and provide the copied copy.

Further, in response to the type of job being 'electronic fax transmission,' the server controlling the self-driving multifunction copier allows the self-driving multifunction copier to transmit the contents associated with the job without moving to the position of the user terminal.

Meanwhile, in response to both the type of current job being currently performed by one of the plurality of self-driving multifunction copiers and the type of subsequent job waiting to be performed being 'printing' and the movement time to move to the position of the user terminal which requests performing the current job being longer than the printing time of the current job, the server controlling the self-driving multifunction copier starts printing of the subsequent job from a time point at which the printing of the current job is terminated.

Further, the server controlling the self-driving multifunction copier may check at least one item of the number of papers, an ink amount, and a battery amount as a maintenance item of the selected self-driving multifunction copier and generate a repairing job for an item which does not meet a criterion to perform the job assigned to the selected self-driving multifunction copier according to the checking result and then assign the generated repairing job to the selected self-driving multifunction copier.

Further, in the specific situation (e.g., attendance time, lunch time, or quitting time), the server controlling the self-driving multifunction copier selects a place which is at a shortest distance from the position of the user terminal which requests performing the job being currently performed by each of the plurality of self-driving multifunction copiers among designated places in the building and allows each of the plurality of self-driving multifunction copiers to move to the selected place. In this case, in response to the server controlling the self-driving multifunction copier provides to the user terminal requesting to perform the job being currently performed a message for 'whether to directly receive' at the selected place and then receives a message for 'it is impossible to directly receive' in response to the message, the server controlling the self-driving multifunction copier may allow the self-driving multifunction copier to temporarily stop the job being currently performed and preferentially perform the subsequent job waiting to be performed.

In response to the self-driving multifunction copier being assigned with the job by receiving the job execution command from the server controlling the self-driving multifunction copier, the self-driving multifunction copier may process the assigned job. Specifically, the self-driving multifunction copier may detect the position of the user terminal requesting to perform the job from the job execution command in link with the job execution command from the server controlling the self-driving multifunction copier (1004). In this case, the self-driving multifunction copier may further detect the type of job from the job execution command.

The self-driving multifunction copier tracks a movement route up to the position of the user terminal requesting to perform the job at a current position based on the map information in the building and moves along the movement route to perform the job (1005).

For example, in response to 'printing' being detected as the type of job, the self-driving multifunction copier may move to the position of the user terminal while processing the job and provide a printed document as a result of performing the job. In response to 'copying' being detected as the type of job, the self-driving multifunction copier may copy the input document by moving to the position of the user terminal and provide the copy in which the document is copied.

Further, in response to 'electronic fax transmission' being detected as the type of job, the self-driving multifunction copier may transmit the contents associated with the job without moving to the position of the user terminal.

In addition, in response to the type of job requested to be performed from the user terminal being 'document fax transmission,' as with the copying job, the server controlling the self-driving multifunction copier allows the selected self-driving multifunction copier to move to the position of the user terminal and then read the input document and transmit the read document to the partner terminal (e.g., the user terminal in another building) of the job.

Further, in response to the type of job requested to be performed from the user terminal being 'electronic fax reception,' the server controlling the self-driving multifunction copier transfers the corresponding contents to the user terminal designated by the partner terminal and in response to the type of job being 'document fax reception,' the server generates a 'fax output' job and assigns the generated 'fax output' job to the self-driving multifunction copier in order to allow the self-driving multifunction copier to print the corresponding contents and transfer the printed contents to the user terminal designated by the partner terminal.

The above-mentioned present disclosure may be implemented as a computer-readable code in a recording medium in which at least one program is written. The computer readable medium includes all types of recording devices in which data readable by a computer system can be stored. Examples of the computer readable medium include a hard disk drive (HDD), a solid state disk (SSD), a silicon disk drive (SDD), a read-only memory (ROM), a random-access memory (RAM), CD-ROM, a magnetic tape, a floppy disk, an optical data storage device, and the like, and it may also be implemented in the form of a carrier wave (for example, transmission over the Internet). In addition, the computer may include a processor or a controller. Therefore, the above description should not be construed as limiting and should be considered illustrative. The scope of the present disclosure should be determined by rational interpretation of the appended claims, and all changes within the scope of equivalents of the present disclosure are included in the scope of the present disclosure.

What is claimed is:

1. A method for operating a server configured to control a self-driving multifunction copier, the method comprising:
   in response to receiving an execution request for a job from a user terminal in a building, calculating a processing time of the job;
   selecting one self-driving multifunction copier among a plurality of self-driving multifunction copiers in the building based on the processing time of the job; and
   assigning the job to the selected self-driving multifunction copier to allow the selected self-driving multifunction copier to perform the assigned job,
   wherein allowing the selected self-driving multifunction copier to perform the assigned job includes, based on (i) a type of a current job being currently performed by one of the plurality of self-driving multifunction copiers and a type of subsequent job waiting to be performed being 'printing' and (ii) a movement time to move to a position of the user terminal requesting performance of the current job being longer than a printing time of the current job, starting printing of the subsequent job from a time point at which the printing of the current job is terminated.

2. The method of claim 1, wherein the allowing to perform the assigned job further includes:

providing a position of the user terminal to the selected self-driving multifunction copier at the time of assigning the job, and tracking, by the selected self-driving multifunction copier, a movement route up to the position of the user terminal based on map information in the building and then moving along the tracked movement route.

3. The method of claim 1, wherein the calculating includes:

for each of the plurality of self-driving multifunction copiers, calculating a movement time required for moving to the position of the user terminal and calculating the processing time of the job by considering the calculated movement time and a job time required for substantially processing the job, and wherein the selecting of the one self-driving multifunction copier includes:

selecting a self-driving multifunction copier having a smallest processing time of the job among the plurality of self-driving multifunction copiers, or selecting a self-driving multifunction copier which can most rapidly perform the job by considering a remaining time of a job being currently performed and a total processing time of jobs waiting to be performed among the plurality of self-driving multifunction copiers.

4. The method of claim 1, wherein the allowing to perform the assigned job further includes at least one of:

in response to a type of the job being 'printing', allowing the self-driving multifunction copier to move to the position of the user terminal while processing the job to provide a printed document as a result of performing the job;

in response to a type of the job being 'copying', allowing the self-driving multifunction copier to move to the position of the user terminal to copy an input document and provide a copied copy; or in response to a type of the job being 'electronic fax transmission,' allowing the self-driving multifunction copier to transmit contents associated with the job without moving to the position of the user terminal.

5. The method of claim 1, wherein the selecting of the one self-driving multifunction copier includes in response to a type of the job being 'electronic fax transmission', based on all of the plurality of self-driving multifunction copiers performing different jobs, selecting a self-driving multifunction copier which is moving for performing the different job, but is not performing printing or copying.

6. The method of claim 1, wherein the selecting of the one self-driving multifunction copier in response to a type of the job being 'emergency printing' includes:

determining a self-driving multifunction copier having a total additional processible time longer than the processing time of the 'emergency printing' job, and providing information on the determined self-driving multifunction copier to the user terminal requesting to perform the 'emergency printing' job so that a self-driving multifunction copier to perform the 'emergency printing' job can be selected, and wherein the determining of the self-driving multifunction copier includes:

calculating the total additional processible time by adding a first additional processible time and a second additional processible time for a self-driving multifunction copier in which both the type of current job being currently performed and the type of subsequent job waiting to be performed are 'printing,' the first additional processible time being acquired by subtracting the printing time of the current job from a first movement time of moving to the position of the user terminal requesting to perform the current job and the second additional processible time being acquired by subtracting the printing time of the subsequent job from a second movement time of moving to the position of the user terminal requesting to perform the subsequent job.

7. The method of claim 1, wherein the allowing to perform the assigned job further includes:

checking at least one item of the number of papers, an ink amount, and a battery amount as a maintenance item of the selected self-driving multifunction copier, and generating a repairing job for an item which does not meet a criterion to perform a job assigned to the selected self-driving multifunction copier according to the checking result and assigning the generated repairing job to the selected self-driving multifunction copier.

8. The method of claim 1, further comprising:

selecting a place located at a shortest distance from the position of the user terminal requesting to perform the job being currently performed in each of the plurality of self-driving multifunction copiers among designated places in the building in the case of a specific situation; and moving each of the plurality of self-driving multifunction copiers to the selected place.

9. The method of claim 8, further comprising:

in response to a message for 'whether to directly receive' at the selected place being provided to the user terminal requesting to perform the job being currently performed and then a message for 'it is impossible to directly receive' being received in response to the message, temporarily stopping the job being currently performed and preferentially performing a subsequent job waiting to be performed.

10. A server configured to control a self-driving multifunction copier, the server comprising:

in response to receiving an execution request for a job from a user terminal in a building, a calculator configured to calculate a processing time of the job;

a selector configured to select one self-driving multifunction copier among a plurality of self-driving multifunction copiers in the building based on the processing time of the job; and a processor configured to assign the job to the selected self-driving multifunction copier to allow the selected self-driving multifunction copier to perform the assigned job, wherein, allowing the selected self-driving multifunction copier to perform the assigned job includes, based on (i) a type of current job being currently performed by one of the plurality of self-driving multifunction copiers and a type of subsequent job waiting to be performed being 'printing' and (ii) a movement time of moving to a position of the user terminal requesting performance of the current job being longer than a printing time of the current job, starting printing of the subsequent job from a time point at which the printing of the current job is terminated.

11. The server of claim 10, wherein in response to a type of the job being 'printing', the processor is configured to allow the self-driving multifunction copier to move to the position of the user terminal while processing the job and to move a printed document as a result of performing the job to a shelf corresponding to the user terminal by using a robot arm of the self-driving multifunction copier.

12. The server of claim 10, wherein the processor is configured to (i) in response to a type of the job being 'copying', allow the self-driving multifunction copier to move to the position of the user terminal and put a document located on a shelf corresponding to the user terminal into an entrance by using a robot arm of the self-driving multifunction copier and (ii) in response to a copy in which the document is copied being output to an exit, move the document and the copy to the shelf corresponding to the user terminal by using the robot arm.

13. The server of claim 10, wherein in response to a type of the job being 'electronic fax transmission', based on all of the plurality of self-driving multifunction copiers performing different jobs, the selector is configured to select a self-driving multifunction copier which is moving for performing the different job, but is not performing printing or copying.

14. The server of claim 10, wherein the processor is configured to (i) check at least one item of the number of papers, an ink amount, and a battery amount as a maintenance item of the selected self-driving multifunction copier, (ii) generate a repairing job for an item which does not meet a criterion to perform the job assigned to the selected self-driving multifunction copier according to the checking result, and (iii) assign the generated repairing job to the selected self-driving multifunction copier.

15. The server of claim 10, wherein in the case of a specific situation, the processor is configured to select a place located at a shortest distance from the position of the user terminal requesting to perform the job currently being performed in each of the plurality of self-driving multifunction copiers among designated places in the building and allow each of the plurality of self-driving multifunction copiers to move to the selected place.

16. The server of claim 15, wherein in response to a message for 'whether to directly receive' at the selected place being provided to the user terminal requesting to perform the job being currently performed and then a message for 'it is impossible to directly receive' being received in response to the message, the processor is configured to allow the self-driving multifunction copier to temporarily stop the job being currently performed and preferentially perform the subsequent job waiting to be performed.

17. A self-driving multifunction copier comprising:
a detector configured to detect a position of a user terminal requesting to perform a job and a type of job from a job execution command in link with the job execution command from a server configured to control the self-driving multifunction copier; and
a controller configured to track a movement route up to the position of the user terminal based on map information in a building and, depending on the type of job, move the self-driving multifunction copier along the tracked movement route,
wherein, allowing the selected self-driving multifunction copier to perform the assigned job includes, based on (i) a type of current job being currently performed and a type of subsequent job waiting to be performed being 'printing' and (ii) a movement time of moving to the position of the user terminal requesting performance of the current job being longer than a printing time of the current job, according to control of the server, starting printing of the subsequent job from a time point at which the printing of the current job is terminated.

18. The self-driving multifunction copier of claim 17,
wherein the controller is configured to allow the self-driving multifunction copier to perform at least one of:
in response to 'printing' being detected as the type of job, moving to the position of the user terminal while processing the job to provide a printed document as a result of performing the job,
in response to 'copying' being detected as the type of job, moving to the position of the user terminal to copy an input document and provide a copy in which the document is copied, or
in response to 'electronic fax transmission' being detected as the type of job, transmitting contents associated with the job without moving to the position of the user terminal.

* * * * *